United States Patent
Lee et al.

(10) Patent No.: US 8,731,152 B2
(45) Date of Patent: *May 20, 2014

(54) REDUCING USE OF PERIODIC KEY FRAMES IN VIDEO CONFERENCING

(75) Inventors: Ming-Chieh Lee, Bellevue, WA (US); Timothy Moore, Bellevue, WA (US); Ce Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 250 days.

This patent is subject to a terminal disclaimer.

(21) Appl. No.: 12/819,119

(22) Filed: Jun. 18, 2010

(65) Prior Publication Data

US 2011/0310217 A1 Dec. 22, 2011

(51) Int. Cl.
*H04M 11/00* (2006.01)

(52) U.S. Cl.
USPC .................................. 379/93.21; 348/14.12

(58) Field of Classification Search
USPC .......... 348/14.01, 14.08, 14.07, 14.09, 14.14, 348/14.15, 14.12; 379/93.21, 158, 202.01, 379/205.01, 68, 88.16, 88.22, 88.23; 455/412.1
See application file for complete search history.

(56) References Cited

U.S. PATENT DOCUMENTS

| | | | |
|---|---|---|---|
| 6,057,884 A | 5/2000 | Chen et al. | |
| 6,526,177 B1 | 2/2003 | Haskell et al. | |
| 6,639,943 B1 | 10/2003 | Radha et al. | |
| 6,707,949 B2 | 3/2004 | Haskell et al. | |
| 6,993,201 B1 | 1/2006 | Haskell et al. | |
| 7,302,002 B2 | 11/2007 | Yagasaki et al. | |
| 7,356,148 B2 | 4/2008 | Hayashi | |
| 7,386,049 B2 | 6/2008 | Garrido et al. | |
| 7,397,858 B2 | 7/2008 | Garrido et al. | |

(Continued)

FOREIGN PATENT DOCUMENTS

| | | |
|---|---|---|
| AU | 2007319699 | 5/2008 |
| CN | 1515118 | 7/2004 |

(Continued)

OTHER PUBLICATIONS

Setton, E., et al.; "Rate-Distortion Optimized Video Peer-to-Peer Multicast Streaming"; Nov. 11, 2005; Information Systems Laboratory, Department of Electrical Engineering, Stanford University, Stanford, CA; P2PMMS'05; accessed at http://www.stanford.edu/~zhuxq/adhoc_project/p2pmms2005.pdf ; 10 pgs.

(Continued)

*Primary Examiner* — Olisa Anwah
(74) *Attorney, Agent, or Firm* — Andrew Smith; Jim Ross; Micky Minhas

(57) ABSTRACT

The generation and delivery of key frames to clients of a video conference are performed in response to a need for a synchronization point. Instead of automatically sending a key frame periodically to each of the clients in the video conference, a key frame is sent to one or more clients upon the occurrence of an event in the video conference. For example, a key frame may be sent to a client when the client joins the video conference. A key frame may also be sent to a client that has packet loss, upon the request of a client, a speaker change within the video conference, when a new stream is added by the client, and the like. The clients in the video conference that are not affected by the event continue to receive predicted frames.

20 Claims, 4 Drawing Sheets

(56) References Cited

U.S. PATENT DOCUMENTS

| | | | |
|---|---|---|---|
| 7,515,759 B2 | 4/2009 | Sun | 382/234 |
| 7,797,454 B2 | 9/2010 | Apostolopoulos et al. | |
| 2002/0114397 A1 | 8/2002 | Todo et al. | |
| 2002/0126759 A1 | 9/2002 | Peng et al. | |
| 2002/0154697 A1 | 10/2002 | Jeon | |
| 2003/0215011 A1 | 11/2003 | Wang et al. | |
| 2004/0086041 A1 | 5/2004 | Ye et al. | |
| 2004/0196972 A1 | 10/2004 | Zhu et al. | |
| 2005/0094726 A1 | 5/2005 | Park | |
| 2005/0254575 A1 | 11/2005 | Hannuksela et al. | |
| 2006/0039480 A1 | 2/2006 | Seo | |
| 2006/0072661 A1 | 4/2006 | Kim et al. | |
| 2006/0179147 A1 | 8/2006 | Tran et al. | |
| 2006/0206560 A1 | 9/2006 | Kanada | |
| 2006/0212542 A1 | 9/2006 | Fang et al. | |
| 2006/0282665 A1 | 12/2006 | Zhu et al. | |
| 2007/0294346 A1* | 12/2007 | Moore et al. | 709/204 |
| 2008/0043832 A1 | 2/2008 | Barkley et al. | |
| 2008/0100694 A1* | 5/2008 | Barkley et al. | 348/14.08 |
| 2008/0247463 A1 | 10/2008 | Buttimer et al. | 375/240.12 |
| 2009/0285299 A1 | 11/2009 | Chen et al. | 375/240.16 |
| 2010/0008419 A1 | 1/2010 | Wu et al. | 375/240.15 |

FOREIGN PATENT DOCUMENTS

| | | |
|---|---|---|
| EP | 1 465 427 | 10/2004 |
| JP | 2001-258004 | 9/2001 |
| JP | 2004-140667 | 5/2004 |
| JP | 2006-098308 | 4/2006 |
| JP | 2009-046680 | 3/2009 |
| WO | 2004/056112 | 7/2004 |

OTHER PUBLICATIONS

Praveenkumar, S., et al.; "*Application of Video Error Resilience Techniques for Mobile Broadcast Multicast Services (MBMS)*"; 2004; Motorola; Proceedings of the IEEE Sixth International Symposium on Multimedia Software Engineering (ISMSE'04); accessed Apr. 14, 2010 at http://ieeexplore.ieee.org/stamp/stamp.jsp?tp=&arnumber=1376701; 6 pgs.

Ni, P., et al.; "*Support for Digital VCR Functionality over Network for H.264/AVC*"; 2008; Department of Informatics, The University of Oslo, NO; accessed Apr. 14, 2010 at http://ieeexplore.ieee.org/stamp/stamp.jsp?tp=&arnumber=4533139; 6 pgs.

Jennehag, U., et al.; "*On Synchronization Frames for Channel Switching in a GOP-based IPTV Environment*"; 2008; Department of Information Technology, Mid Sweden University, Sundsvall, Sweden; accessed Apr. 15, 2020 at http://ieeexplore.ieee.org/stamp/stamp.jsp?tp=&arnumber=4446445; 5 pgs.

Setton, E., et al.; "*Rate-Distortion Analysis and Streaming of SP and SI Frames*"; IEEE Transactions on Circuits and Systems for Video Technology, vol. 16, No. 6, Jun. 2006; accessed on Apr. 15, 2010 at http://ieeexplore.ieee.org/stamp/stamp.jsp?arnumber=01637513; 22 pgs.

European Search Report for European Patent Application No. 07868329.9, mailed Jan. 7, 2013, 9 pages.

Japanese Office Action mailed Jan. 11, 2013 in Appln No. 2009-524766, 9 pgs.

Chang, Y.C. et al., "An Efficient Embedded Bitstream Parsing Processor for MPEG-4 Video Decoding System, 2005, Journal of VLSI Signal Processing 41", pp. 183-191 (Apr. 7, 2011 OA, MS 317807.01).

Eskicioglu, A.M., Delp, E.J., "An Integrated Approach to Encrypting Scalable Video, 2002, 2002 IEEE International Conference on Multimedia and Expo", vol. 1, pp. 573-576 (Apr. 7, 2011 OA, MS 317807.01).

"ITU-T; White Book; audio visual/multimedia relevant (Hseries) recommendation report," pp. 380, 497, and 498, The ITU Association of Japan, Feb. 18, 1995.

Kodama, et al., "review of moving image information transformation describing method in MSP communication service," Technical Report of Ieice, vol. 98, No. 681, pp. 59-64, The Institute of Electronics, Information and Communication Engineers, Mar. 19, 1999.

Wenger, Stefan et al., "RTP Payload Format for H.264/SVC scalable video coding", J. of Zhejiang University Science A; An International Applied Physics and Engineering Journal, Springer, Berlin, DE, vol. 7, No. 5, May 1, 2006, pp. 657-667.

Wenger, Stefan et al., "RTP Payload Format for SVC Video; draft-wenger-avt-rtp-sc-02.txt", No. 2, Jun. 1, 2006 XP015045247, ISSN:0000-0004, 30 pages.

Wenger, Stefan et al., "RTP Payload Format for H.264 Video; rfc3984.1xt", Feb. 1, 2005, XP015009755, ISSN:000-0003, 84 pages.

Wu, Feng, et al. "A Framework for Efficient Progressive Fine Granularity Scalable Video Coding", IEE Transactions on Circuits and Systems for Video Technology, vol. 11, No. 3, Mar. 2001, pp. 332-344.

Zhu, Bin B., et al. "Scalable Protection for MPEG-4 Fine Granularity Scalability", IEEE Trans. Multimedia—Paper #MM000384, 34 pages. (Apr. 7, 2011 OA, MS 317807.01).

Zhu, B.B. et al., "A Framework of Scalable Layered Access Control for Multimedia, 2005, IEEE International Symposium on Circuits and System", vol. 3, pp. 2703-2706 (Apr. 7, 2011 OA, MS 317807.01).

Office Action mailed Apr. 7, 2011, in U.S. Appl. No. 11/504,843 (MS 317807.01).

Office Action mailed Sep. 30, 2011, in U.S. Appl. No. 11/504,843 (MS 317807.01).

Office Action mailed Feb. 14, 2012, in U.S. Appl. No. 11/504,843 (MS 317807.01).

Office Action mailed Sep. 20, 2012, in U.S. Appl. No. 11/504,843 (MS 317807.01).

Office Action mailed Feb. 15, 2013, in U.S. Appl. No. 11/588,708 (MS 317805.01).

Office Action mailed Jul. 3, 2013, in U.S. Appl. No. 11/504,843 (MS 317807.01).

Office Action mailed Sep. 12, 2013, in U.S. Appl. No. 11/588,708 (MS 317805.01).

Office Action mailed Dec. 31, 2013, in U.S. Appl. No. 11/504,843 (MS 317807.01).

\* cited by examiner

REDUCING USE OF PERIODIC KEY FRAMES IN VIDEO CONFERENCING

BACKGROUND

Many people today participate in video conferences. In some video conferencing systems, the video conferencing clients are connected to a video conference server. The video conference server manages and controls the clients in the conference and routes the audio/video streams to the clients. Clients that participate in video conferences typically have different processing capabilities and available bandwidth. Real-time video encoding/decoding and transmission of video streams in network environments can place a large demand on processing and bandwidth capabilities.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The generation and delivery of key frames to clients of a video conference are performed in response to a need for a synchronization point. Instead of automatically sending a key frame periodically to each of the clients in the video conference, a key frame is sent to one or more clients upon the occurrence of an event in the video conference. For example, a key frame may be sent to a client when the client joins the video conference. A key frame may also be sent to a client that has packet loss, upon the request of a client, a speaker change within the video conference, when a new stream is added by the client, and the like. The clients in the video conference that are not affected by the event continue to receive predicted frames.

DETAILED DESCRIPTION

Figure 1:
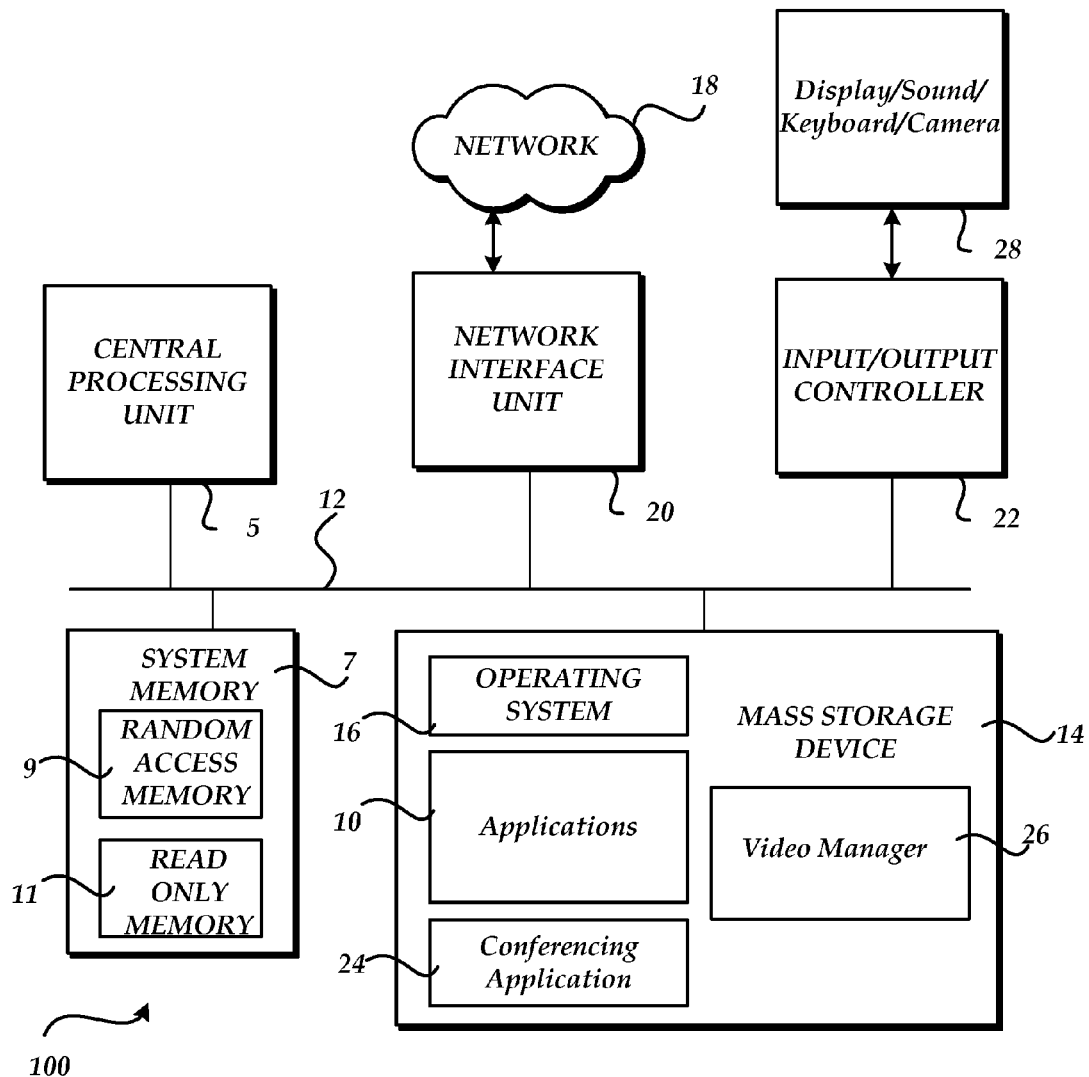
FIG. 1 illustrates a computer architecture for a computer.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop, a server, or mobile computer and includes a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media storage device that can be accessed by the computer 100.

The term computer readable media as used herein may include computer storage media. Computer storage media may include volatile and nonvolatile, removable and non-removable media implemented in any method or technology for storage of information, such as computer readable instructions, data structures, program modules, or other data. System memory 7, removable storage and non-removable storage are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 100. Any such computer storage media may be part of device 100. Computing device 100 may also have input device(s) 28 such as a keyboard, a mouse, a pen, a sound input device, a touch input device, etc. Output device (s) 28 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

According to various embodiments, computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a camera, keyboard, mouse, or electronic stylus (not shown in FIG. 1). Similarly, an input/output controller 22 may provide output to a display screen 28, a printer, or other type of output device. Display 28 is designed to display video, such as a video feed during a video conference.

As mentioned briefly above, a number of program modules and data files may be stored in the mass storage device 14 and RAM 9 of the computer 100, including an operating system 16 suitable for controlling the operation of a networked computer, such as the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs. One of the application programs is a conferencing application 24, such as a video conferencing application. Generally, conferencing application 24 is an application that a user utilizes when involved in a video conference between two or more users. The applications may also relate to other programs that encode/decode video. For example, the application may encode/decode video that is delivered/received to/from a web browser.

Video manager 26 is configured to manage the generation and delivery of key frames (also known as Intra coded frames or I frames) in a video conference. Encoding a key frame uses a lot more bits in the encoding process than encoding a predicted frame (P frame). In one example, a compressed key frame size is approximately 8 to 10 times larger then the corresponding size of a P frame. Although the size of a key frame can be reduced, this sacrifices the key frame quality that may result in an undesirable viewing experience. Generally, video manager 26 determines when a key frame is needed by one or more clients within the video conference, requests the key frame to be generated, and then sends the key frame to the affected client(s). For example, a key frame may be sent when a client joins the video conference, when a client is recovering from packet loss, when a new stream is added by a client, a speaker change in the conference, and the like. The other clients in the video conference continue to receive P frames.

Figure 2:
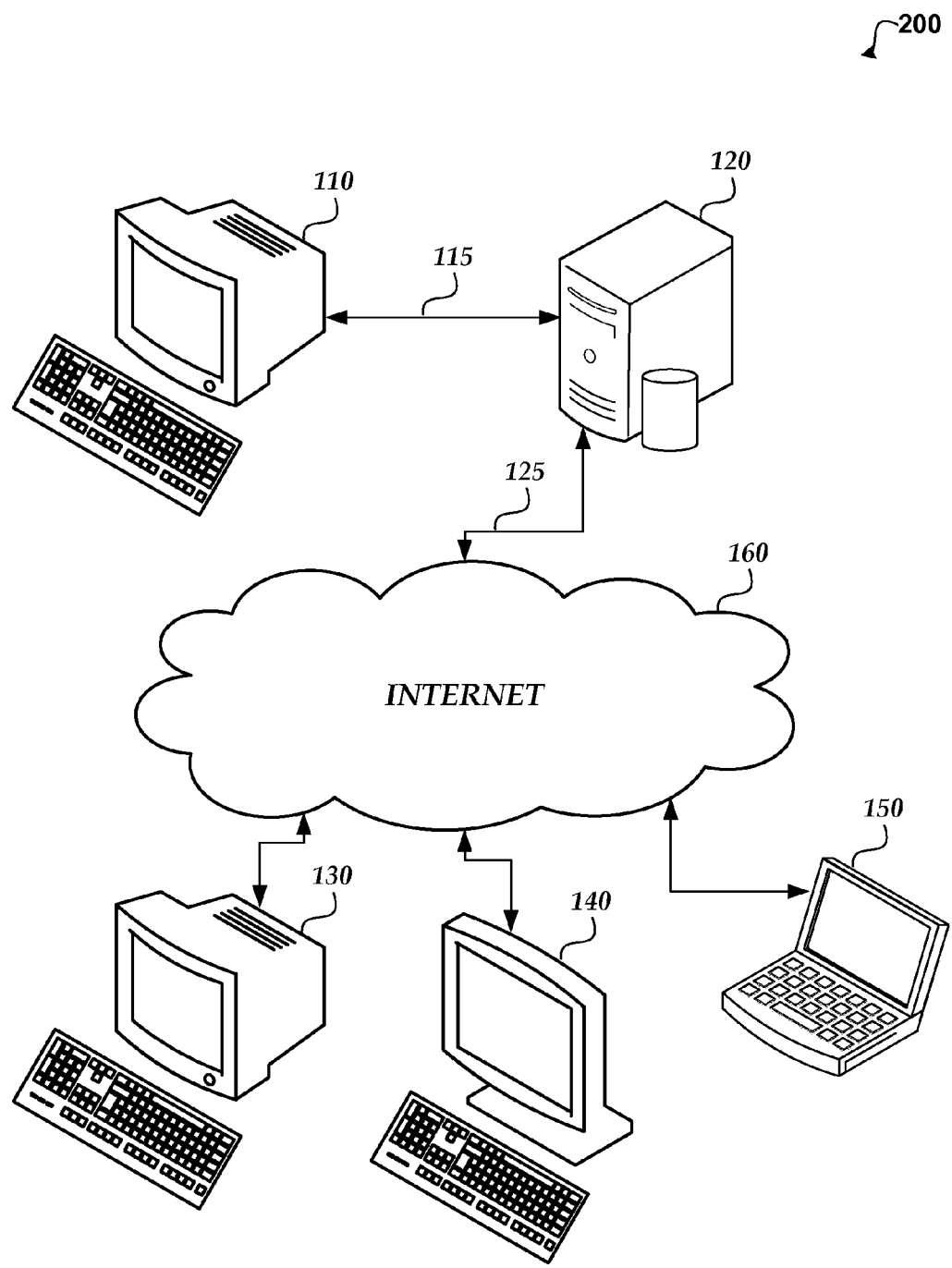
FIG. 2 shows a block diagram of an operating environment.

FIG. 2 shows a block diagram of an operating environment. The operating environment may comprise a video conference environment 200. Video conference environment 200 may comprise a variety of clients having a variety of capabilities, such as an intranet client 110 and a video conference server 120 connected via an intranet network connection 115. Video conference environment 200 may further comprise a first Internet client 130, a second Internet client 140, and a third Internet client 150. Each of the Internet clients may be connected to video conference server 120 via the Internet 160. Video conference server 120, intranet client 110, first Internet client 130, second Internet client 140, and third Internet client 150 may each comprise a computing device, such as the computing device 100 that is described in FIG. 1.

Video conference environment 200 may be used when two or more clients want to share data streams amongst each other. Each client may connect to a video conference using video conference server 120. Video conference server 120 may maintain a list of which clients are connected and each client's capabilities.

The capabilities may be provided by the clients participating in the video conference and/or obtained by the video conference server. The capabilities for each of the clients may include all or a portion of the following, but are not limited to the: processing power, resolution capability, frame rate, bitrate, connection speed, available bandwidth, camera being used, encoding/decoding capability and the like of a client. The capabilities may be different for some/all of the clients. For example, some clients may be able to encode and play back at lower resolutions (e.g. CIF resolution (352×288) with a rate of 15 frames per second (fps) rate); some at medium resolutions (e.g. VGA resolution (640×480 pixels per frame) with a frame rate of 30 fps); and others at higher resolutions (e.g. 720p and 1080p with a 30 fps rate). Additionally, some of the clients may be able to encode and play back a larger number of streams. The clients may also provide video conference server 120 with their desired preferences for viewing and playing video (e.g. full screen mode, full scale mode, small-window mode, bitrate and frame rate).

Video conference server 120 may periodically update any changes in the client's capabilities. For example, video conference server 120 may either periodically automatically analyze or manually analyze network connections and determine that a client has more bandwidth available than previously determined. Video conference server 120 may also receive a message from a client that indicates a change in capability and store that information for use in facilitating the generation of the streams and the data sharing.

Video conference server 120 may also be configured to determine what clients are to generate streams (e.g. audio, video, app sharing, and the like). For example, a client may encode a video stream as a series of video frames comprising a person currently talking in the conference. A video stream may be encoded as a series of video frames wherein each frame may comprise a single image. Each frame may be represented by bits of data. The video stream may be encoded so that not every bit of data in every frame needs to be sent in order to represent the source of the video stream.

Different frame types may be used to encode and/or compress the video stream. Frame types may comprise key frames (I frames), P frames, B frames, SI frames, and SP frames. I frame stands for Intra-Frame, and may comprise a frame that may be decoded by itself without reference to any other frame in a video stream. P frame stands for Predicted Frame and may be decoded by referencing at least one previous frame in the video stream sequence. B frame stands for Bidirectional Predicted Frame and may be decoded by referencing at least one previous frame and at least one subsequent frame in the video stream. SI frames and SP frames are defined by the H.264 video coding standard and are synchronization I frames and P frames that provide synchronization points for a non-I frame. A client may generate streams for more than one resolution. For example, client 130 may be configured to generate streams for 1080p, 720p, 480p, and CIF.

Video conference server 120 may receive a stream from a client (e.g. client 130) and direct the stream to another client (e.g. client 110, client 140 and client 150). Video conference server 120 may also request a client to generate one or more key frames. For example, when a client joins the video conference, video conference server 120 may request a key frame to be generated from each of the clients to which the new client has subscribed. Consistent with embodiments of the invention, the client(s) requested to generate a key frame generate the key frame in addition to the P frame. Upon receiving the key frame and the P frame, video conference server 120 directs the key frame to the new client and the P frame to the other clients receiving a stream from the client. A client may also request a key frame from video conference server 120. For example, a client may request a key frame to recover from a packet loss. A key frame may also be automatically delivered to a client when it is determined that packet loss has occurred. Generally, an key frame is delivered to a client when a synchronization point within the conference is needed by the client.

A key frame may be encoded using different encoding schemes. For example, in some encoding schemes the entire frame may be encoded as a key frame. Consistent with embodiments of the invention, when an encoding scheme that supports slices, such as the H.264/MPEG-4 AVC encoding scheme, is being used only a slice of the frame is encoded as a key frame. For example, the base layer of the frame may be encoded as a key frame and the other layers in the stream may be encoded as P frames. In this way, even when a key frame is needed within the video conference, the size of the I frame with the P frame encoded layers is smaller than encoding the entire frame as a key frame.

Video conference server 120 may also be configured to cache a key frame from one or more clients and send a cached key frame to a client when needed. Reducing the number of key frames sent and delivered to clients is directed at improving the display of video streams in a video conference. For example, since fewer key frames are generated by clients, video conference server 120 has less demand on it and as a result it may be able to process more streams. Jitter may also be reduced since the delivery of P frames takes less time then delivery of key frames.

Video conference server 120 may also be configured to cache a key frame and generate one or more P frames at predetermined intervals for a predetermined time period following the occurrence of an event, such as a dominant speaker change. For example, upon a dominant speaker change video conference server 120 may generate and cache an I frame and generate a long term P frame that references the cached I frame every second for the following five seconds after the dominant speaker change. Since there are generally many subscribers to the dominant speaker, generating the periodic long-term P frames on the video conference server may reduce the traffic to/from the video conference server.

Figure 3:
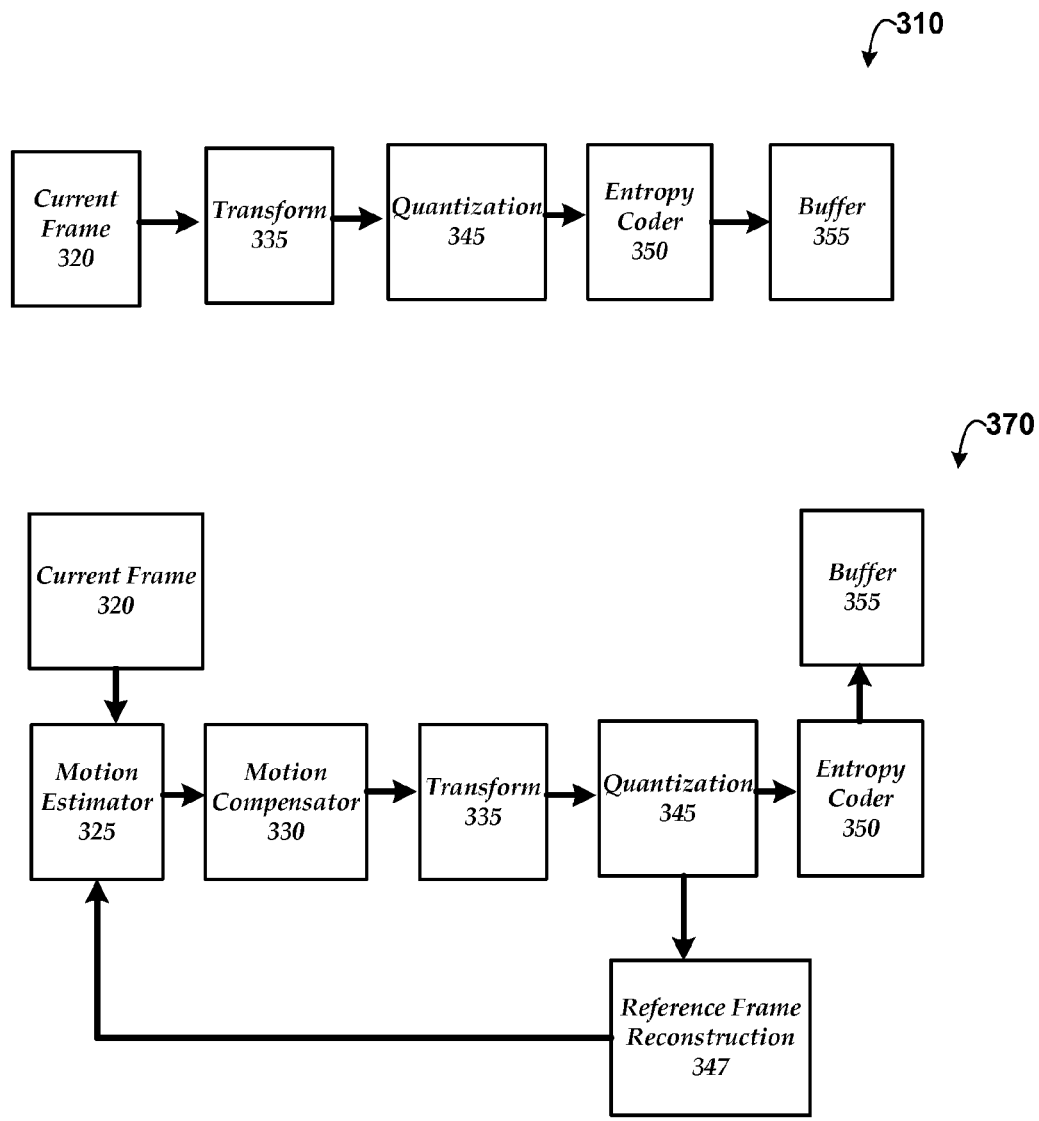
FIG. 3 illustrates an exemplary block-based intra-frame/inter-frame compression paths.

FIG. 3 illustrates an exemplary block-based intra-frame/inter-frame compression paths. The encoder system receives a sequence of video frames including a current frame and produces compressed video as output.

The encoder system illustrated compresses predicted frames and key frames. FIG. 3 shows a path 310 for key frames through the encoder system and a path for predicted frames 370. Many of the components of the encoder system are used for compressing both key frames and predicted frames. The exact operations performed by those components can vary depending on the type of information being compressed. Generally, a key frame contributes much more to bitrate than a predicted frame. In low or mid-bitrate applications, key frames can become bottlenecks for performance.

A predicted frame, also called P frame, B frame for bi-directional prediction, or inter-coded frame, is represented in terms of prediction (or difference) from one or more other frames. A prediction residual is the difference between what was predicted and the original frame. In contrast, a key frame, also called I frame, intra-coded frame, is compressed without reference to other frames. A frame may be split into blocks of pixels, such as 8×8, 4×4, and the like, depending on the encoding process utilized.

When current frame 320 is a predicted frame, a motion estimator 325 estimates motion of macroblocks, or other sets of pixels, of the current frame 320 with respect to a reference frame, which is a reconstructed previous frame that may be buffered in a frame store. In alternative embodiments, the reference frame is a later frame or the current frame is bi-directionally predicted. The motion estimator 325 can estimate motion by pixel, ½ pixel, ¼ pixel, or other increments, and can switch the resolution of the motion estimation on a frame-by-frame basis or other basis. The resolution of the motion estimation can be the same or different horizontally and vertically.

A motion compensator 330 applies the motion estimation information to the reconstructed previous frame to form a motion-compensated current frame. Generally, motion estimator 325 and motion compensator 335 may be configured to apply any type of motion estimation/compensation.

A frequency transformer 335 converts the spatial domain video information of the current frame into frequency domain (i.e., spectral) data. A DCT is a type of frequency transform that converts the block (spatial information) into a block of DCT coefficients that are frequency information. The DCT operation itself is lossless or nearly lossless. Compared to the original pixel values, however, the DCT coefficients are more efficient to compress since most of the significant information is concentrated in low frequency coefficients. For block-based video frames, the frequency transformer 335 applies a DCT or variant of DCT to blocks of the pixel data or prediction residual data, producing blocks of DCT coefficients. Alternatively, the transformer 335 applies another conventional frequency transform such as a Fourier transform or uses wavelet or subband analysis. The frequency transformer 335 may be configured to apply an 8×8, 8×4, 4×8, or other size frequency transforms (e.g., DCT) to the frames.

When a reconstructed current frame is needed for subsequent motion estimation/compensation, reference frame, reconstructor 347 performs inverse quantization on the quantized spectral data coefficients. An inverse frequency transformer then performs the inverse of the operations of the frequency transformer 335 producing a reconstructed prediction residual (for a predicted frame) or a reconstructed key frame.

When the current frame 320 is a key frame, the reconstructed key frame is taken as the reconstructed current frame (not shown). If the current frame 320 is a predicted frame, the reconstructed prediction residual is added to the motion-compensated current frame to form the reconstructed current frame. A frame store may be used to buffer the reconstructed current frame for use in predicting the next frame.

Quantizer 345 quantizes the transformed coefficients using the determined quantization factor. Generally, the quantization factor is applied to each coefficient, which is analogous to dividing each coefficient by the same value and rounding. For example, if a coefficient value is 130 and the quantization factor is 10, the quantized coefficient value is 13. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. Adjusting the quantization factor based on the current frame is directed at providing a more consistent video experience for the user.

The entropy coder 350 compresses the output of the quantizer 345 as well as certain side information (e.g., motion information, spatial extrapolation modes, quantization step size). Typical entropy coding techniques include arithmetic coding, differential coding, Huffman coding, run length coding, LZ coding, dictionary coding, and combinations of the above. The entropy coder 350 typically uses different coding techniques for different kinds of information (e.g., DC coefficients, AC coefficients, different kinds of side information), and can choose from among multiple code tables within a particular coding technique. The entropy coder 350 puts compressed video information in buffer 355. Generally, compressed video information is depleted from buffer 355 at a constant or relatively constant bitrate and stored for subsequent streaming at that bitrate. Generating fewer key frames reduces the bandwidth requirement.

Some encoding schemes, such as H.264/MPEG-4 AVC, use SI frames and SP frames. Generally, the size of SI frames and SP frames may be smaller then other encoded I frames and P frames. In this way, even when a key frame is needed within the video conference, the size of the SI frame is smaller than other code I frames.

According to another embodiment, the key frame may be distributed across two or more frames. For example, a portion of each of the frames that the key frame is distributed may include an I macroblock. For instance, the first MB row is coded as I, and the rest of the frame is coded as P. For the second frame, the second MB row is coded as I, and the rest of the frame is coded P, etc. In this example, the key frame is distributed across N frames, where N is the number of MB rows in the coded frames. This reduces the burst of a key frame when it is sent and distributes the size of the key frame over time. The key frame may also be over-encoded within frames to assist in protecting against packet loss. For example, a same portion of the key frame may be included in two or more frames.

Figure 4:
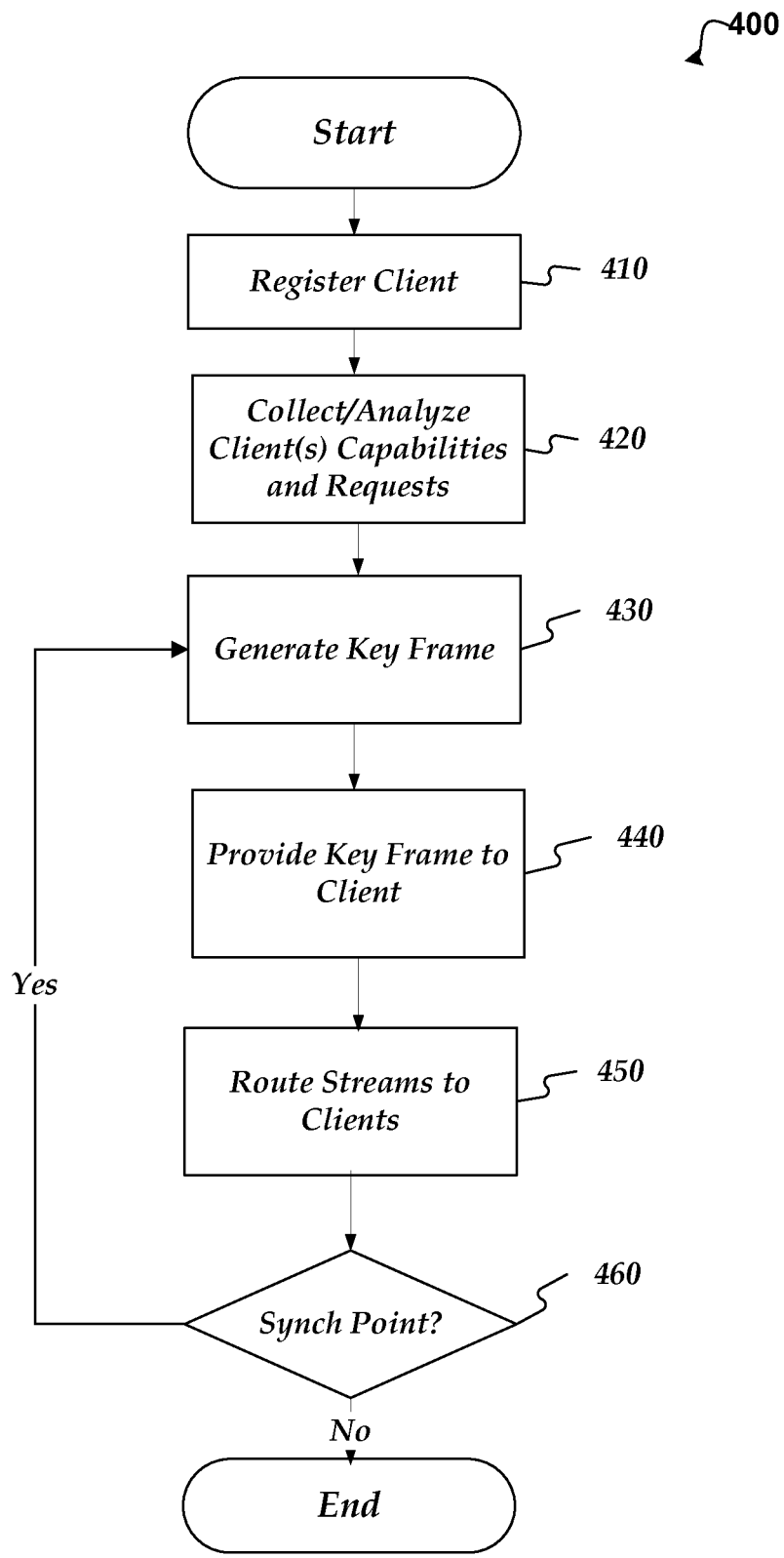
FIG. 4 shows a process for determining when to send a key frame as a synchronization point.

Referring now to FIG. 4, an illustrative process for determining when to send a key frame as a synchronization point is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, the operation flows to operation 410, where a client registers to participate in the video conference. For example, a client may be operatively connected to computing device 100 via a network connection and may request participation in a video conference.

Moving to operation 420, capabilities and requests of the registered client are collected and/or analyzed. For example, computing device 100 may determine an amount of bandwidth available to the client. Computing device 100 may also determine data processing capabilities for the client, such as video encoding and/or decoding capability and/or data processing speed. Video encoding/decoding capability may include a resolution capability, such as a maximum resolution capability. A subscription request may also be received from the client. The request may include information such as a desired resolution, bitratre and frame rate. Consistent with embodiments of the invention, computing device 100 may receive multiple subscription requests from any and/or all of the clients participating in the video conference. For example, one client may request lower resolution versions of all the other participating clients; another client may request a high resolution version from whichever client may be designated an active speaker in the video conference and low resolution versions from some or all of the other clients.

Moving to operation 430, one or more key frames is generated to send to the new client to the video conference. The key frames may be generated by one or more of the existing clients and/or video conference server participating in the video conference. For example, for each client that is to generate a stream for the new client, the video conference server may request that a key frame be generated for the new client and sent to the video conference server. Consistent with embodiments of the invention, the existing clients also generate a predicted frame in addition to the key frame.

Flowing to operation 440, the key frame(s) is provided to the client. The key frame is used as a synchronization point for the new client. Consistent with embodiment of the invention, the key frame is not provided to the other clients in the video conference.

Transitioning to operation 450, the video conference server routes the generated streams to clients. During normal operation, the clients receive P frames without automatically and periodically receiving a key frame.

Transitioning to decision operation 460, a determination is made as to whether a synchronization point is needed by a client. For example, a client may be experience packet loss or a new stream may be added by the client. When a synchronization point is needed by the client, the process returns to operation 430 where a key frame is generated. The key frame(s) generated may include all or a portion of the clients to which the client is subscribed.

When a synchronization point is not needed, the process flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for reducing the use of key frames, comprising:
   receiving a registration request from a client to join a video conference comprising existing clients, the existing clients receiving P frames during the video conference without automatically and periodically receiving a key frame during the video conference;
   determining a stream to send to a client in the video conference; wherein the stream comprises video that is associated with at least one of the clients of the video conference;
   after receiving the registration request from the client, requesting a key frame and a P frame to be generated by the at least one of the clients of the video conference in response to the registration request; and
   sending the key frame that is generated by the at least one of the clients of the video conference to the client in response to the registration request, wherein the key frame is created from a frame of the stream after receiving the registration request; and sending a predicted frame that is created using the frame of the stream to at least one of the other clients without sending the key frame to the at least one of the other clients.

2. The method of claim 1, wherein sending the key frame to the client occurs in response to an event that occurs in the video conference comprising a packet loss by the client.

3. The method of claim 1, wherein sending the key frame to the client occurs in response to an event that occurs in the video conference, wherein the event is at least one of: a request from the client; a packet loss by the client; and a dominant speaker change with the video conference.

4. The method of claim 3, further comprising generating a key frame in response to the occurrence of the event in the video conference.

5. The method of claim 4, wherein generating the key frame comprises requesting at least one of the other clients in the video conference to generate the key frame.

6. The method of claim 4, wherein generating the key frame comprises requesting at least one of the other clients in the video conference to generate the key frame in addition to generating a predicted frame.

7. The method of claim 4, wherein generating the key frame comprises encoding only a base layer of the frame as the key frame and encoding at least one enhancement layer as a predicted frame.

8. The method of claim 1, wherein sending the key frame to the client comprises distributing the key frame over at least two frames.

9. The method of claim 1, further comprising caching a key frame such that the cached key frame is used when sending the key frame to the client.

10. A computer-readable storage medium, excluding a signal, having computer-executable instructions for generating a key frame for a client in a video conference including existing clients, comprising:
sending P frames during the video conference to the existing clients within the video conference without automatically and periodically sending key frames to the existing clients during the video conference;
determining a synchronization point in the video conference in which a key frame is to be sent to the client within the video conference, comprising;
determining when a packet loss by the client occurs;
determining a stream to send to the client in the video conference; wherein the stream comprises frames of video;
requesting a key frame and a P frame to be generated; and
sending the key frame that is generated to the client, wherein the key frame is created from a frame of the stream; and sending a predicted frame that is created using the frame of the stream to at least one of the other clients in the video conference without sending the key frame to the at least one of the other clients.

11. The computer-readable storage medium of claim 10, wherein determining the synchronization point in the video conference comprises determining when a client registers to participate in the video conference.

12. The computer-readable storage medium of claim 10, wherein determining the synchronization point in the video conference comprises determining at least one of: a packet loss by the client and a dominant speaker change with the video conference.

13. The computer-readable storage medium of claim 12, further comprising generating the key frame after determining the synchronization point.

14. The computer-readable storage medium of claim 13, wherein generating the key frame comprises requesting at least one of the other clients in the video conference to generate the key frame.

15. The computer-readable storage medium of claim 13, wherein generating the key frame comprises requesting at least one of the other clients in the video conference to generate the key frame in addition to generating a predicted frame.

16. The computer-readable storage medium of claim 13, wherein generating the key frame comprises encoding a base layer of the frame as the key frame and encoding at least one enhancement layer as a predicted frame.

17. The computer-readable storage medium of claim 10, wherein sending the key frame to the client comprises distributing the key frame over at plurality of frames and including a duplicate portion of the key frame in at least two of the frames.

18. The computer-readable storage medium of claim 10, further comprising caching a key frame and generating predicted frames on a video conference server in response to a dominant speaker change.

19. A system for generating a key frame for a client in a video conference including existing clients, comprising:
a processor and a computer-readable medium;
an operating environment stored on the computer-readable medium and executing on the processor;
a video manager operating on the processor; and configured to perform tasks, comprising:
sending P frames during the video conference to the existing clients within the video conference without automatically and periodically sending key frames to the existing clients during the video conference;
determining an occurrence of an event in the video conference, wherein the event is at least one of: a registration of the client, a request from the client; and a packet loss by the client; generating a key frame in response to the occurrence of the event;
requesting a key frame and a P frame to be generated in response to the occurrence of the event;
sending the key frame generated in response to the occurrence of the event to the client and sending a predicted frame to each of the other clients in the video conference without sending the key frame.

20. The system of claim 19, wherein generating the key frame comprises requesting at least one of the other clients in the video conference to generate the key frame in addition to generating a predicted frame.

* * * * *